US009317606B1

(12) United States Patent
Nayak et al.

(10) Patent No.: US 9,317,606 B1
(45) Date of Patent: Apr. 19, 2016

(54) SPELL CORRECTING LONG QUERIES

(71) Applicant: Google Inc., Mountain View, CA (US)

(72) Inventors: P. Pandurang Nayak, Mountain View, CA (US); Juraj Gottweis, Zurich (CH)

(73) Assignee: Google Inc., Mountain View, CA (US)

( * ) Notice: Subject to any disclaimer, the term of this patent is extended or adjusted under 35 U.S.C. 154(b) by 149 days.

(21) Appl. No.: 13/757,271

(22) Filed: Feb. 1, 2013

Related U.S. Application Data

(60) Provisional application No. 61/594,873, filed on Feb. 3, 2012.

(51) Int. Cl.
*G06F 17/30* (2006.01)

(52) U.S. Cl.
CPC ............................ *G06F 17/30864* (2013.01)

(58) Field of Classification Search
CPC .............................................. G06F 17/30864
USPC ......................................................... 707/706
See application file for complete search history.

(56) References Cited

U.S. PATENT DOCUMENTS

| | | | | |
|---|---|---|---|---|
| 5,765,180 | A * | 6/1998 | Travis | 715/257 |
| 6,256,630 | B1 * | 7/2001 | Gilai et al. | |
| 6,401,084 | B1 * | 6/2002 | Ortega et al. | 707/706 |
| 6,853,993 | B2 * | 2/2005 | Ortega et al. | |
| 7,194,684 | B1 * | 3/2007 | Shazeer | 715/205 |
| 7,254,774 | B2 * | 8/2007 | Cucerzan et al. | 715/257 |
| 7,590,626 | B2 * | 9/2009 | Li et al. | 707/708 |
| 7,783,660 | B2 * | 8/2010 | Nomula et al. | 707/769 |
| 7,840,577 | B2 * | 11/2010 | Ortega et al. | 707/758 |
| 8,543,378 | B1 * | 9/2013 | Westphal | 704/9 |
| 2002/0152204 | A1 * | 10/2002 | Ortega et al. | 707/3 |
| 2007/0106937 | A1 * | 5/2007 | Cucerzan et al. | 715/533 |
| 2008/0010316 | A1 * | 1/2008 | Liao et al. | 707/104.1 |
| 2008/0104056 | A1 * | 5/2008 | Li et al. | 707/5 |
| 2009/0248669 | A1 * | 10/2009 | Shetti et al. | 707/5 |
| 2010/0180198 | A1 * | 7/2010 | Iakobashvili et al. | 715/257 |
| 2011/0022952 | A1 * | 1/2011 | Wu et al. | 715/257 |
| 2011/0295897 | A1 * | 12/2011 | Gao et al. | 707/780 |
| 2012/0130706 | A1 * | 5/2012 | Qiu et al. | 704/9 |
| 2013/0019191 | A1 * | 1/2013 | Arnold | 715/765 |
| 2013/0124492 | A1 * | 5/2013 | Gao et al. | 707/706 |
| 2013/0283156 | A1 * | 10/2013 | Al Badrashiny et al. | 715/257 |

OTHER PUBLICATIONS

Ahmed, Farag, et al., "Revised N-Gram based Automatic Spelling Correction Tool to Improve Retrieval Effectiveness", Polibits, vol. 40, © 2009, pp. 39-48.*
Zhang, Ying, et al., "Detection and Translation of OOV Terms Prior to Query Time", SIGIR '04, Sheffield, South Yorkshire, UK, Jul. 25-29, 2004, pp. 524-525.*
Turchin, Alexander, et al., "Identification of Misspelled Words without a Comprehensive Dictionary Using Prevalence Analysis", AMIA 2007 Symposium Proceedings, © 2007, pp. 751-755.*
Bao, Zhuowei, et al., "A Graph Approach to Spelling Correction in Domain-Centric Search", Proc. of the 49th Annual Meeting of the Assn for Computational Linguistics, Portland, OR, Jun. 19-24, 2011, pp. 905-914.*

(Continued)

*Primary Examiner* — Robert Stevens
(74) *Attorney, Agent, or Firm* — Middleton Reutlinger

(57) ABSTRACT

A computer implemented method and system for spell correcting terms within a string of terms that a computer system receives from a computer readable data string representative of a user search query.

30 Claims, 4 Drawing Sheets

(56) References Cited

OTHER PUBLICATIONS

Ruch, Patrick, et al., "Toward filling the gap between interactive and fully-automatic spelling correction using the linguistic context", ICSMC 2001, Tucson, AZ, Oct. 7-10, 2001, pp. 199-204.*

Sayle, Roger, et al., "Improved Chemical Text Mining of Patents with Infinite Dictionaries and Automatic Spelling Correction", J. Chem. Inf. Model, vol. 52, No. 1, Dec. 28, 2011 (epub), pp. 51-62.*

Tsuruoka, Yoshimasa, et al., "Probabilistic Term Variant Generator for Biomedical Terms", SIGIR '03, Toronto, Canada, Jul. 28-Aug. 1, 2003, pp. 167-173.*

Ernst-Gerlach, Andrea, et al., "Retrieval in Text Collections with Historic Spelling using Linguistic and Spelling Variants", JCDL '07, Vancouver, British Columbia, Canada, Jun. 18-23, 2007, pp. 333-341.*

Lu, Tifei, et al., "XClean: Providing Valid Spelling Suggestions for XML Keyword Queries", ICDE Conference 2011, Hannover, Germany, Apr. 11-16, 2011, pp. 661-672.*

Martins, Bruno, et al., "Spelling Correction for Search Engine Queries", EsTAL 2004, LNAI 3230, Springer-Verlag, Berlin, © 2004, pp. 372-383.*

Cucerzan, Silviu, et al., "Spelling correction as an iterative process that exploits the collective knowledge of web users", EMNLP, vol. 4, © 2004, pp. 293-300.*

Kernighan, Mark D., et al., "A Spelling Correction Program Based on a Noisy Channel Model", COLING '90, Proc. of the 13th Conf. of Computational Linguistics, vol. 2, © 1990, pp. 205-210.*

* cited by examiner

SPELL CORRECTING LONG QUERIES

CROSS REFERENCE TO RELATED APPLICATIONS

This application claims the benefit of U.S. Provisional Application No. 61/594,873 filed on Feb. 3, 2012, entitled "Spell Correcting Long Queries," the disclosure of which is incorporated by reference herein in its entirety.

BACKGROUND

This specification relates generally to spell checking and spell correcting. Search engines, which are often utilized in an on-line browser environment, have become a common tool for locating and retrieving documents, relevant websites and other relevant information residing on wide area networks, such as the internet, or residing on local area networks. There are various search engines that can be accessed via the internet, and various websites include search boxes on their webpages so that a user can enter natural language search queries in order to locate and access relevant information. The search engine that is accessed will generate results responsive to the search query and will return the search results to the user. The search results that are provided are based on the search terms of the search query as entered by the user.

However, often, users may enter a misspelled term, which if not detected and corrected, can adversely affect the search results. Therefore, many search engine tools have a spell-check and spell-correct feature. If a likely spelling error is detected, the tool can notify the user of the misspelled term and can even make suggestions for a correction to the misspelling. However, extensive spell checking can result in delays in returning the search results, particularly depending on the length of the search query and the number of terms that are spell-checked and corrected.

SUMMARY

In a computer implemented method for spell correcting terms within a string of terms, a computer system receives a search query; identifies a plurality of search terms of the search query; determines a model term score for the identified search terms; selects candidate terms from the identified search terms of the search query based on the model term scores; and provides the candidate terms to a spell correction system. The computer based language model of the computer system determines a model term score for each search term based on the language model's determination of likelihood of a misspelling for the given term. The computer system will determine the language model term score, and will provide to the spell correct system a predetermined number N of search terms. The language model can determine whether each term of the user search query is in a dictionary of the language model and for each term found in the dictionary of the language model a language model term score can be determined and the search terms having a threshold score can be provided as candidate terms for spell correction to the spell check and spell correct system, where the threshold scores are based on the model term scores.

For search terms not found in the language model, the remaining search terms, the computer can utilize an n-gram model for the remaining search terms not found in the language model and determine a character n-gram model term score. The character n-gram model term score has a higher value than any of the language model term scores because if the search term is not found in the language model it will have a higher likelihood of being misspelled. In some implementations, determining the language model term score is based on the probability of misspelling estimated by the language model. The statistical probability of being misspelled, in some implementations, can be based on frequency of the term occurring in the model. The lower the frequency of occurrence of a term, the higher the score reflective of a higher likelihood of being misspelled. Determining a character n-gram model term score is based on the probability of a character sequence occurring in a language as estimated by the character n-gram model. If the probability of a sequence of a character occurring in a language is low, then the higher the score for likelihood of being misspelled.

In some implementations the computer implemented method can select the candidate terms by selecting a predetermined number of search terms having threshold scores, where providing the candidate terms to the spell correction system comprises providing the predetermined number of search terms to the spell correction system and receiving alternative versions of the candidate terms from the spell correction system.

In some implementations the computer implemented method can determine a total number of terms M that is to be spell corrected to avoid latency in returning the search results. In order to provide context when spell-checking and spell-correcting, the method can take the total number M of terms to be corrected and determine the context number of terms that is desired on either side of each of the N terms having the highest score. The context number of terms on either side can be multiplied by 2 resulting in a product (P) in order to take into consideration contextual terms on both sides of the N terms having the highest scores. The method can add one to the product (P+1) in order to consider each of the N terms. The total M terms can be divided by the result (P+1) thereby providing the number N. For example, if the total terms is determined to be 10 and the context number of terms is determined to be 2, then the context number 2 is multiplied by 2 and 1 is added thereby resulting in 5. The total terms 10 is divided by 5 and the result is 2, which is N. This will provide a context when spell correcting the highest most likely misspelled terms. The predetermined number N can be based on avoidance of latency, statistical data regarding minimum score thresholds above which spell correction should occur. Other calculation methods can be utilized without departing from the scope of the invention.

If one or more of the terms of the search query are assigned the same score, then scoring between those terms can be based on proximity to a search term having a threshold score. In some implementations, the computer implemented method will generate a computer readable suggestion in the form of a data string adapted for transmission from the computer system. The data string is representative of suggesting an alternative spelling to one or more of the search terms.

In some implementations of the computer implemented method, a computer system can receive a computer readable data string representative of a user search query including multiple search terms. A computer based language model can determine if a portion of the data string corresponding to a search term of the search query is in the language model. A language model term score can be determined for each search term based on the probability of misspelling estimated by the language model using term frequency if the search term is found in the language model. The language model term score can be associated to the portion of the data string corresponding to the search term. In some implementations the computer system processes an n-gram model for each search term if the search term is not found in the language model, and can determine an n-gram model term score based on the probability of sequence of characters estimated by the character n-gram model. The n-gram model score can be associated to the portion of the data string corresponding to the term of the search query. A predetermined number of highest scoring portions of the data string corresponding to the highest term scores of the search query can be spell corrected.

In some implementations, the threshold scores may be the highest model term scores.

One or more of the implementations as described herein have the advantage of spell checking the entire search query or string of terms rather than spell checking only select terms without a latency impact and further has the advantage of identifying the most likely misspelled terms for spell correction. These and other advantageous features of the present method and system will be in part apparent and in part pointed out herein below.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

BRIEF DESCRIPTION OF THE DRAWINGS

For a better understanding of the present implementation, reference may be made to the accompanying drawings in which.

Figure 1:
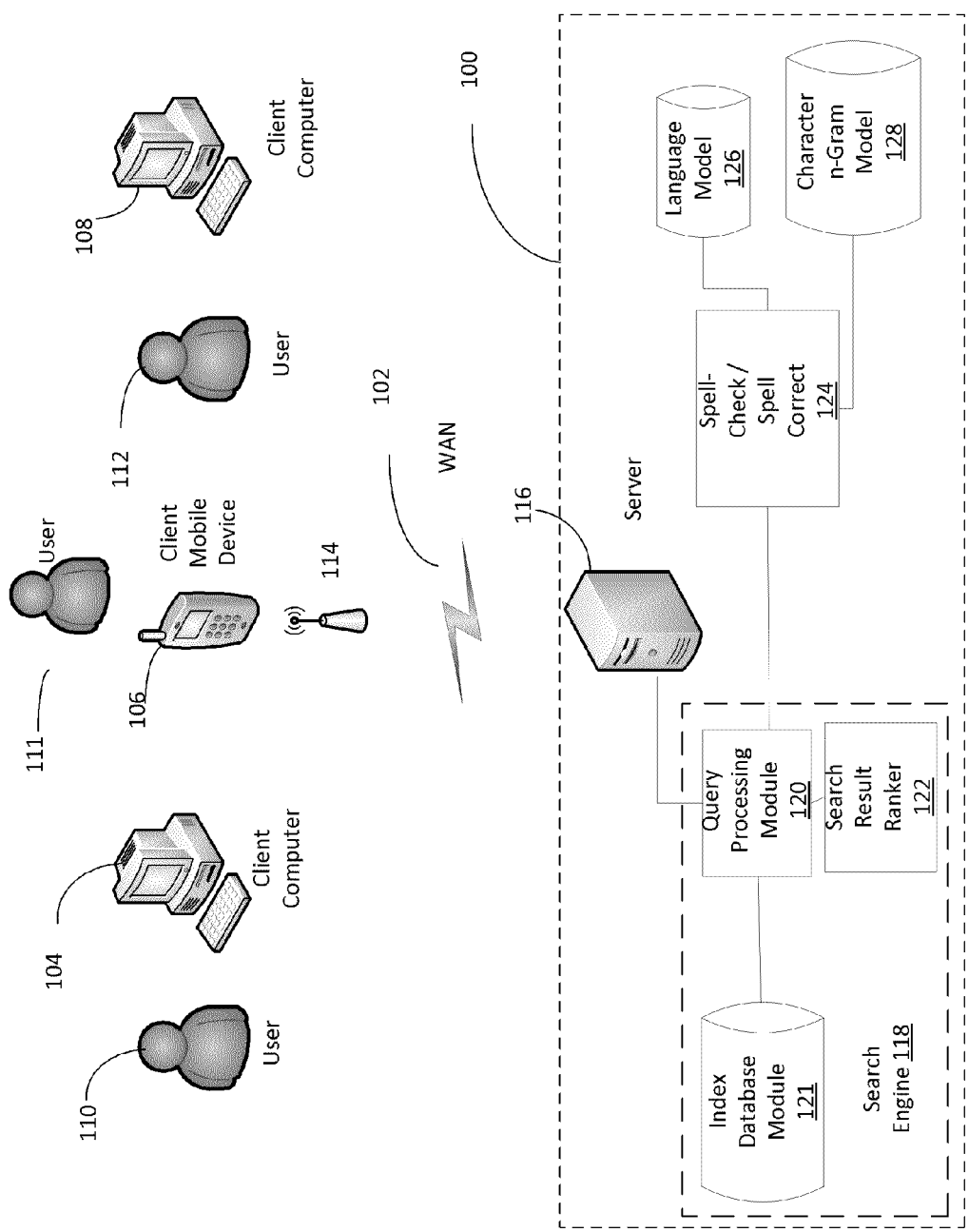
FIG. 1 is an illustration of a computing system for performing a computer implemented method.

While the method and system can include various modifications and alternative forms, specific implementations thereof are shown by way of example in the drawings and will herein be described in detail. It should be understood, however, that the drawings and detailed description presented herein are not intended to limit the method and system as disclosed and claimed herein to the particular implement as disclosed, but on the contrary, the intention is to cover all modifications, equivalents, and alternatives falling within the spirit and scope of the present method and system as defined by the appended claims.

DETAILED DESCRIPTION

According to implementation(s) of the present method and system, various views are illustrated in FIGS. 1-3B and like reference numerals are being used consistently throughout to refer to like and corresponding parts of the method and system for all of the various views and figures of the drawing. Also, please note that the first digit(s) of the reference number for a given item or part of the method or system corresponds to the Fig. number in which the item or part is first identified.

An implementation of the computer implemented method for spell correction as described herein teaches a method and system for spell correcting terms within a string of terms using a computer system, which receives a computer readable data string representative of a user search query.

The computer system receives a search query having a plurality of search terms. The system uses the language model to determine a language model term score for each search term in the plurality of search terms using a computer based language model that determines a likelihood of misspelling for each search term. The system selects a plurality of search terms based on the language model term scores and provides the selected plurality of search term to a spell correction system.

The details of the method and system and various implementations can be better understood by referring to the figures of the drawing. Referring to FIG. 1, a block diagram is provided illustrative of a computing system in an example environment for implementing the method for identifying terms within a string of terms for spell correction. The environment illustrated is a server to client environment connected over a wide area network (WAN) 102, such as the internet environment. On the client side of the WAN, a user, 110, 111, 112 can access the computer system 100 over the WAN via a client computer 104, 108, mobile computing device 106 or other client computing device. Client computer systems can have access to an internet service provider (ISP) in order to gain access to the internet. Mobile devices can similarly have access, however, access can be provided through a wireless link 114. The client computing device can have for example a browser application based user interface for navigating to the URL of the computing system 100.

Access and communication to the computing system can be through the computer system server 116, which can perform the operation of an information server that can receive search queries. In addition to the server, the computing system can include a search engine which includes a query processing module, an index database module and a search result ranker. The index database module 121 indexes data for documents and can be keyed by keywords of the documents that are available in the database being searched. The query processing module 120 interprets the terms of the search query and interfaces with the index module to locate relevant documents by matching the interpreted search terms to the keyword index. The search result ranker module 122 will rank the relevant documents for presenting the search results in the order of relevance. The computing system is also shown having a spell-check and spell-correct system module 124 for performing spell checking and spell correction. A language model 126 and a character n-gram model 128 are also shown. In practice some items shown separately could be combined and some items could be further separated, as would be recognized by one of ordinary skill in the art area. For example, the index database module of 121 could be separated or the language model 126 and the character n-gram model 128 could be combined.

In computing systems, a spell check and spell correction system is an application program that flags words in a document or other word string that may be misspelled. Spell check application programs may be stand-alone and capable of operating on a block or string of text, or as part of a larger application, such as a word processor, email client, electronic dictionary or search engine. The spell-check application program can include a spell check and spell correct module 124 including a set of spell check routines that can scan the text or string of words and can extract the individual words and compare the words against a dictionary of a language model. The language model 126 can have a dictionary component and a language model component including stored common phrases, statistical word frequency data and context base algorithms with other associated statistical information. The language model can assign a score or value for likelihood of a word being misspelled based on statistical word frequency data and/or based on context based algorithms or other associated statistical data. The language model determines the probability that a word will appear in a query based on the frequency of the word in a collection of words, phrases and/or documents found in the model. The model determines the likelihood of the word appearing in the collection of words, phrases and/or documents represented by the model. The scanning routines of the spell check application program can include language dependent algorithms for handling word structure and morphology.

The computing system can also include a statistically based module such as character n-gram models 128, which determine the likelihood of a sequence of characters occurring in a given language. An n-gram model models a language at the character level, e.g., rather than looking at the likelihood of a particular word appearing in a given context, the n-gram model looks at the likelihood of a n-length sequence of characters, e.g., an n-gram, occurring. The model looks at the statistical probability of the sequence of characters occurring in the language. The model can assign a score to the term based on the statistical probability. For example, in some implementations, the lower the probability, the higher the score assigned to the term. The model can look at both the statistical frequency of the n-gram (sequence of characters) as well as whether the n-gram is likely possible or likely impossible in a given language and the model can assign a score based on this determination.

When a search query is received by the computing system, the spell check and spell correct program module can execute a set of spell check routines that can scan the text or string of words from the search query and can extract the individual words and compare the words against a dictionary of a language model. If the word is found in the dictionary, the language model can determine likelihood of the word being misspelled. For example, in some implementations, the language model determines the likelihood of the word being misspelled based on a statistical frequency of word in the language. The model looks at the probability that a word would appear in a query based on the frequency of the word found in a collection of words, phrases and/or documents found in the model. The model determines the likelihood of the word appearing in the collection of words, phrases and/or documents within the model. The language model can assign a score to the word based on the likelihood determined. If the word is not found in the dictionary, the language model can assign a default high score indicative of a high likelihood of being misspelled or the spell check and spell correct module can utilize a statistical based model such as a character n-gram model.

The spell check and spell correct module can also include a correction system that provides a suggestion for the correct spelling. The language model can provide the terms and their scores to the spell check and spell correct system. Correcting may include applying pattern matching algorithms or context based analysis; or this may determine what the likely intended word is in a given context of words. Context based algorithms can assess the likelihood of misspelling even if the word is in a dictionary of the language model, but is likely misspelled based on its use in the context of the surrounding words. The correction system can generate candidate corrections using rule-based methods (such as based on inflections or based on commonly misspelled words) or similarity key techniques. The candidate corrections can be ranked based on statistical probability such as transition probability (probability of going from one letter to the next) or confusion probability (probability of one letter being mistaken). The words and scores determined by the language model and the character n-gram model can be returned to the spell check and spell correct module where the spell correct system can analyze words having an assigned score higher than a predetermined threshold in order to determine suggested correct spellings of the word. The correction system can apply pattern matching algorithms or context based analysis; or determine what the likely intended word is in a given context of words.

The correction system can for example correct the search query with corrected terms to be utilized by the query processing module for processing the search. In some implementations the correction system can generate a suggested corrected search query for review by the originator of the search query. In some implementations the correction system can generate suggested corrections to certain terms within the search query for review by the originator of the search query.

Various language model methods and constructs are well known to those skilled in the art area including, as described above, models that look at the probability that a word would appear in a query based on the frequency of the word found in a collection and the statistical probability of the sequence of characters occurring in the language. Variations in the language models and/or variations in the character n-gram model other than those described herein can occur without departing from the scope of the various implementations as disclosed and claimed herein.

As described above a spell check system can be part of a search engine tool that can be accessed by a user by using a client computer. A user can access a search engine tool or can access a website that incorporates a search engine tool. In some implementations the user can access the tool using a typical browser based user interface. Some websites essentially have a dedicated search engine, whereas others handle their search requests through a third-party search engine tool.

Upon origination of the search query, the website into which the search is entered or other originator of the search generates and sends a search request, for example in the form of a data string that is representative of the string of words or terms in the search query to the computing system and server 100 and 116. In some implementations, the client may generate and send the search query directly to the computing system without routing the request through the website.

As shown in FIG. 1, the computing system includes a server, which is connected to the search engine 118, which includes the search result ranker 122 and the index database module 121. The index database module 121 indexes or catalogs a large number of indexed documents retrieved from different websites based on keywords of the documents. The search result page ranker serves as a query-independent measure of the document's importance.

For example, the front server 116 passes the search request onto the search engine 118. The search engine 118 then communicates with the index database module 120 to select a plurality of documents in response to the search request. The search engine 118 utilizing the search result ranker 122 assigns a ranking score to each document, for example, based on the quality of the document or the relevance of the document to the search query.

When entering a search request, the originator of the search query may input a misspelled term, which if not detected and corrected, can adversely affect the search results. Therefore, many search engine tools have a spell-check and spell-correct feature. If a likely spelling error is detected, the tool can notify the user of the misspelled term and can even make suggestions for a correction to the misspelling. However, extensive spell checking can result in delays in returning the search results, particularly depending on the number of terms that are spell-checked and corrected.

As described above, search queries are often long. In order to reduce the latency of returning a search result due to lengthy search queries, search engine developers have limited the number of terms that will be processed by the spell-check and spell-correct systems. Some have limited the number of terms to be spell checked and corrected by only spell-checking and spell-correcting the first predetermined number of terms as they appear in the search query. This has not proven to be a very effective method because the misspelled term could be toward the end of the lengthy search query. The computer implemented method disclosed and claimed herein analyzes the entire query and identifies terms to be provided to the spell correct system the entirety of the search query (all terms) can be assessed with minimal latency impact.

The present computer implemented method looks at all of the terms and assigns a score or ranking value indicative of the likelihood of being misspelled. The spell check system will spell check the N most likely misspelled terms based on a predetermined high score. For example, the N most likely misspelled terms may be the terms having the highest model term scores. The predetermined number N can be based on latency avoidance, statistical data regarding minimum score thresholds above which spell correction should occur and/or statistical data for maximizing spell correction efficacy. For example, a statistical analysis of the effect of setting N to different values on system latency and spell correction efficacy can be performed, and the value of N can be selected to balance the tradeoff between latency and efficiency.

Some implementations of the method spell check the terms in view of a surrounding context for the terms, e.g. a number of terms on either side of each of the N terms. The computer implemented method can determine a total number of terms M that is to be spell corrected to avoid latency in returning the search results, for example, based on a statistical analysis of the effect of M on latency. The number of terms on either side of the N terms in the context can be determined by determining the total M terms to be spell checked. Some implementations can take the total number M of terms to be corrected and determine the context number of terms that is desired on either side of each of the N terms having the highest score. The context number of terms on either side can be multiplied by 2 resulting in a product (P) in order to take into consideration contextual terms on both sides of the N terms having the highest scores. The method can add one to the product (P+1) in order to consider each of the N terms. The total M terms can be divided by the result (P+1) thereby providing the number N. Other methods for determining M and N can be utilized without departing from the scope of the implementation as disclosed and claimed herein. For example, a statistical analysis of the effect of setting M and N to fixed values on system latency and spell correction efficacy can be performed, and the value of M and N can be selected to balance the tradeoff between latency and efficiency.

The spell-check and spell-correct application program module 124 can scan and extract the portions of the data string that are representative of the individual terms in a user's search query. The spell check system can determine if the term is in the language model, for example, as described above. If the term is found by the language model, then a language model score can be assigned and associated to the portion of the data string corresponding to the term. If the term is not found in the language model, then the character n-gram model can be utilized for the term and a character n-gram model score can be assigned and associated to the portion of the data string and term not found in the language model, for example, as described above. This score can be implemented such that it is always a higher value than any of the language model scores indicative of a greater likelihood of being misspelled. Determining the language model term score can be based on the probability of misspelling estimated by the language model using term frequency, and determining a character n-gram model term score is based on the probability of a character sequence occurring in a language as estimated by the character n-gram model.

Figure 2:
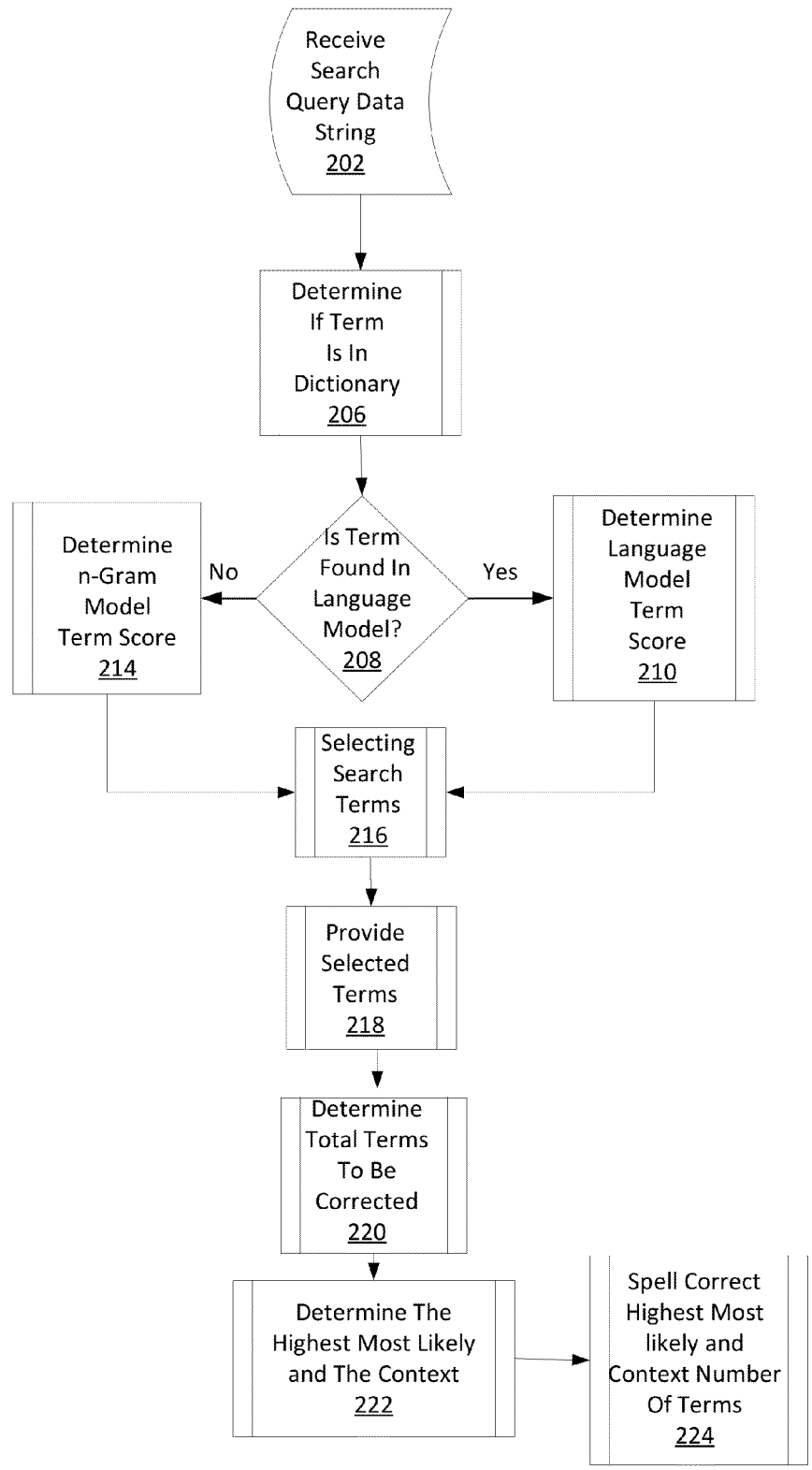
FIG. 2 is an illustration of a flow diagram for the computer implemented method.

Referring to FIG. 2, an illustration of a flow diagram for the computer implemented method is shown. A computer system receives a computer readable data string representative of a user search query. The computer system receives a search query 202 comprising a plurality of search terms and determines a language model term score 210 for each search term in the plurality of search terms using the computer based on the language model that determines a likelihood of a misspelling for a given term. The system can select a plurality of search terms 216 based on the language model term scores, and provide the selected plurality of search terms 218 to a spell correction system.

In some implementations the computer system can further identify the terms having the highest scores 222 utilizing the spell check and spell correct module based on the determined language model term score from the highest ranking value to the lowest, and spell correct a predetermined number of highest most ranking search terms 224. The language model can determine whether each term of the user search query is in the dictionary of the language model and for each term found in the dictionary of the language model, a language model term score can be determined 210. The language model term score is indicative of the likelihood of being a misspelled term, which can be determined by the language model based on frequency of the term, for example, as described above.

For search terms not found in the language model, referred to as the remaining search terms, the computer system can utilize an n-gram model for the remaining search terms not found in the language model and determine a character n-gram model term score 214, for example, as described above. The character n-gram model term score has a higher value than any of the language model term scores because if the search term is not found in the language model it will be determined to have a higher likelihood of being misspelled. Similarly, the character n-gram model can return a plurality of terms 218 with their associated scores. In some implementations the computer system can further rank order the search terms utilizing the spell check and spell correct module based on the determined score from the highest ranking value to the lowest, and spell correct a predetermined number of highest most ranking search terms. In some implementations, the language model assigns the score for terms found in the dictionary and the character n-gram model assigns the score for terms not found in the dictionary.

As described above, determining the language model term score in some implementations is based on the probability of misspelling estimated by the language model using term frequency, and determining a character n-gram model term score in some implementations is based on the probability of a character sequence estimated by the character n-gram model.

The language model and the character n-gram model can return a plurality of terms 218 and their associated scores to the spell check and spell correct module of the computer system, however, it may not be practical to spell correct all terms. The computer implemented method can predetermine the number N of highest most likely misspelled terms 222 that are practical to spell correct. In some implementations the computer implemented method can also determine a total number of terms M that is to be spell corrected 220 to avoid latency in returning the search results. The total number of terms M can be determined based on historical statistical data retrieved from performance testing as to what is practical to avoid a latency factor. This statistical data can be gathered from performance testing and determining the thresholds before latency occurs, for example, as described above.

To further enhance the spell correction system the computer implemented method can also provide the contextual terms 222 surrounding the N most likely misspelled terms to the spell check and spell correct system. In order to provide context when spell-checking and spell-correcting, the method can as described above take the total number M of terms to be corrected and determine the context number of terms that is desired on either side of each of the N terms having the highest score. The context number of terms on either side can be multiplied by 2 resulting in a product (P) in order to take into consideration contextual terms on both sides of the N terms having the highest scores. The method can add one to the product (P+1) in order to consider each of the N terms. The total M terms can be divided by the result (P+1) thereby providing the number N. This will provide a context when spell correcting the highest most likely misspelled terms 224. The context terms can also be provided to the spell correction system. Context can provide a robust spell correct system because it provides grammatical context, syntax context, semantic context, phrase context and other contextual factor for a robust spell correction system.

The context number is the number of terms on either side of each N term in order to bring context to each of the N terms. The context number for example, can be set to 2 such that two terms on either side of each of the N terms are also spell corrected to provide the appropriate context for the N terms. The context number can be balanced with the N number of terms and the total M terms to be spell corrected because if the total M terms remains fixed in order to avoid latency issues, then the higher the context term is, the lower is the number N of terms to be considered. The number of N terms must be at a level to make the spell check and spell correct system more effective. The context number could always be set to a fixed number, for example 2, where the fixed number is determined based on performance data relating to the efficacy of a spell check and spell correct system. The context number could be based on the total number of terms M or a target N number and the context number could vary depending on how the total number M varies and how the number of N terms vary.

A language model term score can be determined for each search term based on the probability of misspelling estimated by the language model using term frequency if the search term is found in the language model.

The computer system can determine a character n-gram model term score based on the probability of sequence of characters estimated by the character n-gram model. A selected plurality of terms based on the score can be provided to the spell correction system.

The computer system can select the plurality of search terms by selecting a predetermined number of search terms having the highest scores, and providing the selected plurality of search terms to a spell correction system by providing the predetermined number of search terms to a spell correction system. The system can receive a predetermined number of corrected search terms having the highest scores from the spell correction system. To avoid terms having the same score, the system can for example provide a higher score to one of two or more terms having the same score based on proximity to a term having a highest score. Another example is not to provide a higher score unless some portion of the one or more terms having the same score are within the N highest scores and another portion of the one or more having the same score are not within the N highest scores, in which case the scores are adjusted based on closer proximity to the term having the highest score.

Figure 3A:
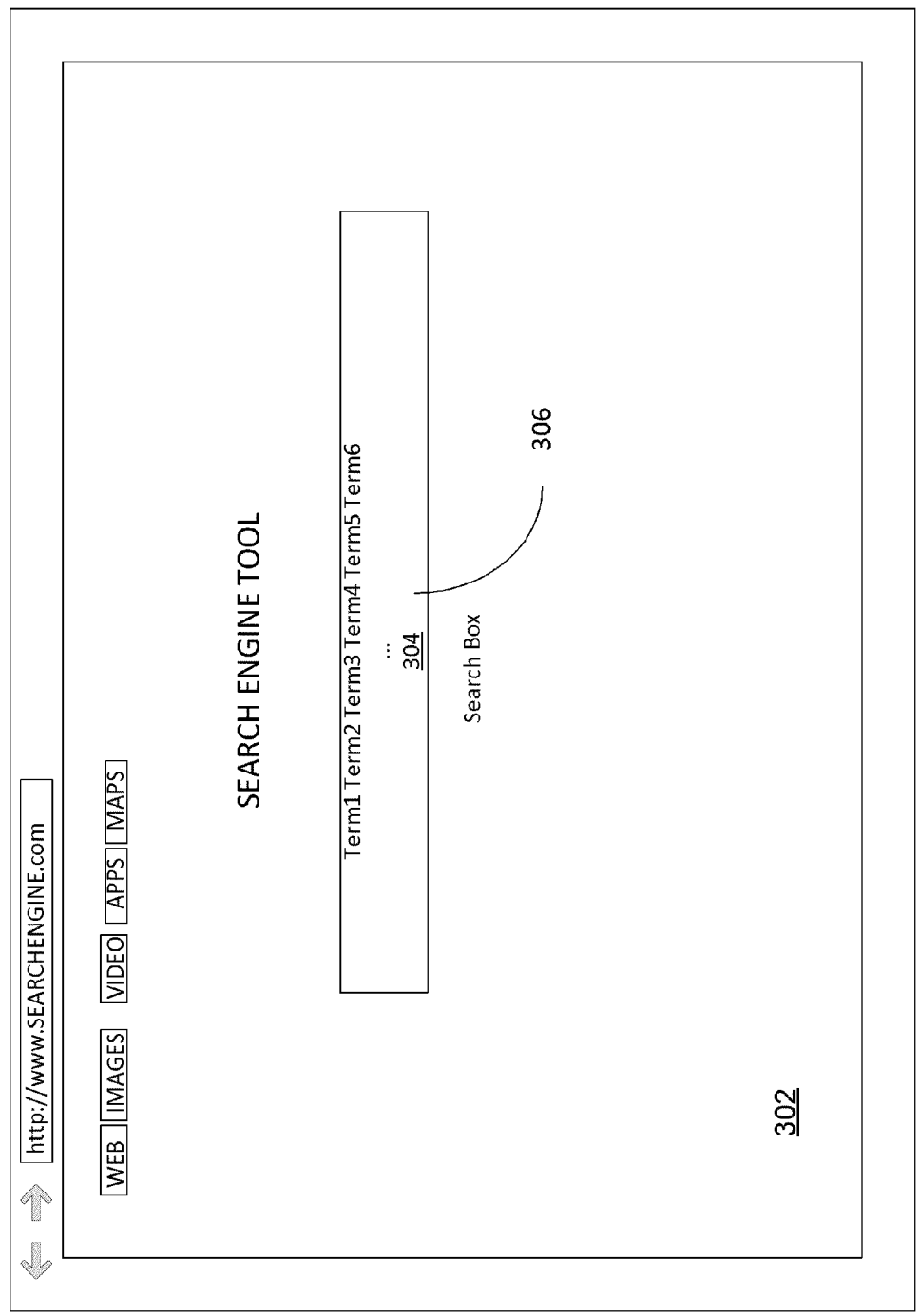
FIGS. 3A and 3B are an illustration of a screen of a search engine browser based tool.
Figure 3B:
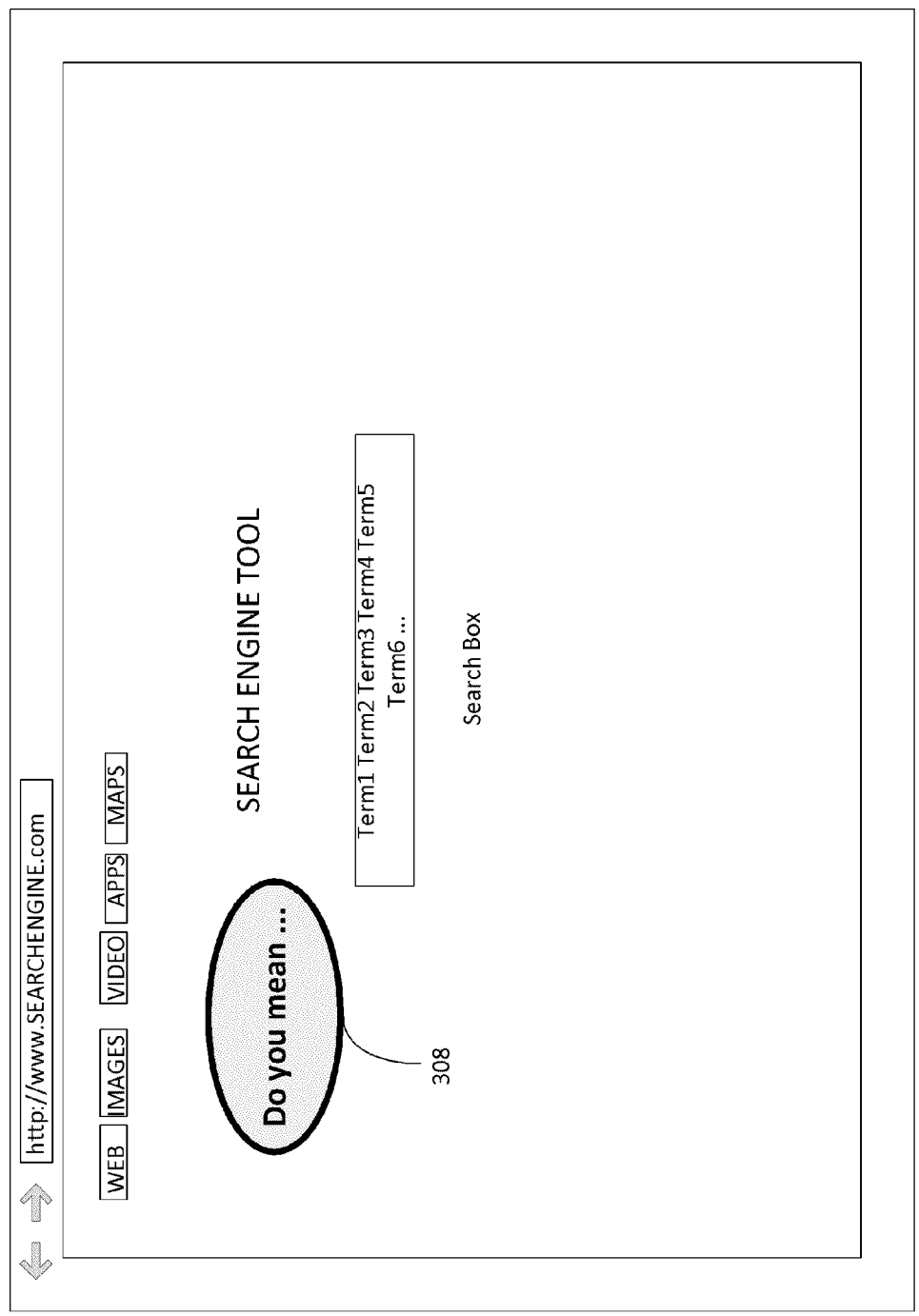

Referring to FIGS. 3A and 3B an illustration of a screen of a search engine browser based tool is shown. FIG. 3A illustrates a typical browser screen having a search engine tool displayed with a search box 306 for entry of the search terms. FIG. 3B illustrates a typical feedback displayed to the user when a suspected spelling error has occurred, for example, "Do you mean . . . " 308. A user can access a search engine tool or can access a website that incorporates a search engine tool. The user can access the tool using a browser based user interface 302 as seen in FIG. 3A. Some websites essentially have a dedicated search engine, whereas others handle their search requests through a third-party search engine tool. Upon a user inputting a search query 304 into a search box 306 as seen in FIG. 3A, where the search query may have a string of terms—Term1 Term2 Term3 . . . , the website into which the search is entered, generates and sends a search request, for example in the form of a data string that is representative of the string of words or terms in the search query as entered into the search box of the browser based user interface of the client computing device.

The correction method can for example correct the search query with corrected terms. In some implementations the correction method can generate a suggested corrected search query for review by the originator of the search query. In some implementations the correction method can generate suggested corrections to certain terms within the search query for review by the originator of the search query. The suggestion generated to be presented to the user and be presented to the user in a "Did you mean" pop-up 308 as seen in FIG. 3B, which provides either a rewritten query and or suggested corrections to terms within the query.

The various implementations and examples shown above illustrate a method and system for spell correcting long queries. A user of the present method and system may choose any of the above implementations, or an equivalent thereof, depending upon the desired application. In this regard, it is recognized that various forms of the subject spell correcting method and system could be utilized without departing from the spirit and scope of the present implementation.

As is evident from the foregoing description, certain aspects of the present implementation are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present implementation. Accordingly, the specification and drawings are to be regarded in an illustrative rather than a restrictive sense.

Certain systems, apparatus, applications or processes are described herein as including a number of modules. A module may be a unit of distinct functionality that may be presented in software, hardware, or combinations thereof. When the functionality of a module is performed in any part through software, the module includes a computer-readable medium. The modules may be regarded as being communicatively coupled. The inventive subject matter may be represented in a variety of different implementations of which there are many possible permutations.

The methods described herein do not have to be executed in the order described, or in any particular order. Moreover, various activities described with respect to the methods identified herein can be executed in serial or parallel fashion. In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine or computing device. Further, while only a single machine is illustrated, the term "machine" shall also be taken to include any collection of machines that individually or jointly execute a set (or multiple sets) of instructions to perform any one or more of the methodologies discussed herein.

The example computer system 100 and client computers 106, 108, 110 include a processor (e.g., a central processing unit (CPU) a graphics processing unit (GPU) or both), a main memory and a static memory, which communicate with each other via a bus. The computer system may further include a video/graphical display unit (e.g., a liquid crystal display (LCD) or a cathode ray tube (CRT)). The computer system 100 and client computing devices 106, 108, 110 also include an alphanumeric input device (e.g., a keyboard), a cursor control device (e.g., a mouse), a drive unit, a signal generation device (e.g., a speaker) and a network interface device.

The drive unit includes a computer-readable medium on which is stored one or more sets of instructions (e.g., software) embodying any one or more of the methodologies or systems described herein. The software may also reside, completely or at least partially, within the main memory and/or within the processor during execution thereof by the computer system, the main memory and the processor also constituting computer-readable media. The software may further be transmitted or received over a network via the network interface device.

The term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present implementation. The term "computer-readable medium" shall accordingly be taken to include, but not be limited to, solid-state memories, and optical media, and magnetic media.

Other aspects, objects and advantages of the present implementation can be obtained from a study of the drawings, the disclosure and the appended claims.

What is claimed is:

1. A computer implemented method, comprising:
   receiving a search query;
   identifying a plurality of search terms of the search query;
   determining a model term score for each of the identified search terms, the model term score for a given search term of the identified search terms being indicative of a probability of misspelling of the given search term, wherein determining the model term score for the given search term includes determining whether the given search term is in a dictionary of a language model and wherein the model term score for the given search term is determined independent of any alternative suggestions that are alternative spellings of the given search term;
   selecting candidate search terms from the identified search terms of the search query based on the model term scores, the candidate search terms being a subset of the identified search terms of the search query, wherein selecting a candidate search term of the candidate search terms comprises selecting the candidate search term based on the model term score for the candidate search term being more indicative of misspelling than the model term scores of other of the identified search terms not selected as one of the candidate search terms; and
   providing the candidate search terms to a spell correction system.

2. The computer implemented method as recited in claim 1, wherein determining the model term score for each of the identified search terms further includes:
   determining whether each of the identified search terms is in a dictionary of a language model; and
   determining a language model term score for each of the identified search terms found in the dictionary of the language model.

3. The computer implemented method as recited in claim 2, wherein determining the model term score for each of the identified search terms further includes:
   determining an n-gram model term score for each of the identified search terms not found in the dictionary of the language model, where each n-gram model term score has a value more indicative of misspelling than any of the language model term scores.

4. The computer implemented method as recited in claim 3, wherein the language model term score is based on the probability of misspelling estimated by the language model using term frequency, and where determining the n-gram model term score is based on the probability of a character sequence estimated by the character n-gram model.

5. The computer implemented method as recited in claim 4, wherein selecting the candidate search terms comprises selecting a predetermined number of the identified search terms having model term scores that satisfy a threshold, and where providing the candidate search terms to the spell correction system comprises providing the predetermined number of the identified search terms to the spell correction system and receiving alternative versions of the candidate search terms from the spell correction system.

6. The computer implemented method as recited in claim 5, further comprising:
   determining a total number of terms M to be spell corrected;
   determining a context number of terms that is desired on either side of each of N terms having model term scores that satisfy the threshold;
   multiplying the context number of terms by 2 resulting in a product (P);
   adding one to the product resulting in (P+1);
   dividing total number of terms M by the result (P+1) thereby providing the number N; and providing the context number of terms on either side of each of the N terms having model term scores that satisfy the threshold to the spell correction system.

7. The computer implemented method as recited in claim 6, further comprising:
providing an improved score to one of two or more terms having the same model term scores based on proximity to a term with a model term score that satisfies the threshold.

8. The computer implemented method as recited in claim 1, further comprising:
receiving a suggestion from the spell correction system, the suggestion representative of suggesting an alternative spelling to one or more of the identified search terms.

9. The computer implemented method in claim 1, wherein determining the model term score for each of the identified search terms further includes:
determining if each of the identified search terms is in a language model and determining a language model term score for each of the identified search terms determined to be in the language model, wherein the language model term score is based on the probability of misspelling estimated by the language model using term frequency; and
determining an n-gram model term score for each of the identified search terms received and determined to not be in the language model, where determining the n-gram model term score is based on the probability of a character sequence estimated by the character n-gram model.

10. The computer implemented method of claim 9, wherein each n-gram model term score has a value more indicative of misspelling than any of the language model term scores.

11. The computer implemented method as recited in claim 10, further comprising:
determining a total number of search terms to be spell corrected;
determining a context number of terms that is desired on either side of each of N terms having model term scores that satisfy the threshold;
multiplying the context number of terms by 2 resulting in a product (P);
adding one to the product resulting in (P+1);
dividing total number terms by the result (P+1) thereby providing the number N; and
providing the context number of terms on either side of each of the N terms having model term scores that satisfy the threshold to the spell correction system.

12. The computer implemented method as recited in claim 11, further comprising:
providing a higher score to one of two or more terms having the same model term score based on order of appearance.

13. The computer implemented method as recited in claim 11, further comprising:
providing a higher score to one of two or more terms having the same model term score based on proximity to a term with a model term score that satisfies the threshold.

14. The computer implemented method as recited in claim 9, further comprising:
receiving a suggestion from the correction system, the suggestion representative of suggesting an alternative spelling to one or more of the search terms.

15. A system comprising one or more processors configured to perform operations comprising:
receiving a search query;
identifying a plurality of search terms of the search query;
determining a model term score for each of the identified search terms, the model term score for a given search term of the identified search terms being indicative of a probability of misspelling of the given search term, wherein determining the model term score for the given search term includes determining whether the given search term is in a dictionary of a language model and wherein the model term score for the given search term is determined independent of any alternative suggestions that are alternative spellings of the given search term;
selecting candidate search terms from the identified search terms of the search query based on the model term scores, the candidate search terms being a subset of the identified search terms of the search query, wherein selecting a candidate search term of the candidate search terms comprises selecting the candidate search term based on the model term score for the candidate search term being more indicative of misspelling than the model term scores of other of the identified search terms not selected as one of the candidate search terms; and
providing the candidate search terms to a spell correction system.

16. The computer system as recited in claim 15, wherein the processor configurations for determining the model term score for each of the identified search terms further include configurations for:
determining whether each of the identified search terms is in a dictionary of a language model; and
determining a language model term score for each of the identified search terms found in the dictionary of the language model.

17. The computer system as recited in claim 16, wherein the processor configurations for determining a model term score for each of the identified search terms further include configurations for:
determining an n-gram model term score for each of the identified search terms not found in the dictionary of the language model, where each n-gram model term score has a value more indicative of misspelling than any of the language model term scores.

18. The computer system as recited in claim 17, wherein the processor configurations for the language model are such that the language model term score is based on the probability of misspelling estimated by the language model using term frequency, and where the processor configurations for determining the n-gram model term score are such that the n-gram model term score is based on the probability of a character sequence estimated by the character n-gram model.

19. The computer system as recited in claim 18, wherein the processor configurations for selecting candidate search terms include configurations for selecting a predetermined number of the identified search terms having model term scores that satisfy a threshold, and where processor configurations for providing the candidate search terms to a spell correction system include configurations for providing the predetermined number of the identified search terms to a spell correction system.

20. The computer system as recited in claim 18, wherein the processor configurations for selecting the candidate search terms include configurations for selecting a predetermined number of the identified search terms having model term scores that satisfy a threshold, and where the processor configurations for providing the candidate search terms to a spell correction system include configurations for providing the predetermined number of identified search terms to a spell correction system, and receiving alternative versions of the candidate search terms from the spell correction system.

21. The computer system as recited in claim 15, wherein the processors are configured to perform operations further comprising:
receiving a suggestion from the spell correction system, the suggestion representative of suggesting an alternative spelling to one or more of the identified search terms.

22. The computer system as recited in claim 15, wherein the processor configurations for determining the model term score for each of the identified search terms includes processor configurations for:
determining if each of the identified search terms is in a language model and determining a language model term score for each of the identified search terms determined to be in the language model, wherein the language model term score is based on the probability of misspelling estimated by the language model using term frequency; and
determining an n-gram model term score for each of the identified search terms received and determined to not be in the language model, where determining the n-gram model term score is based on the probability of a character sequence estimated by the character n-gram model.

23. The computer system as recited in claim 22, wherein each n-gram model term score has a value more indicative of misspelling than any of the language model term scores.

24. The computer system as recited in claim 23, wherein the processors are configured to perform operations further comprising:
determining a total number of search terms to be spell corrected;
determining a context number of terms that is desired on either side of each of N terms having model term scores that satisfy the threshold;
multiplying the context number of terms by 2 resulting in a product (P);
adding one to the product resulting in (P+1);
dividing total number terms by the result (P+1) thereby providing the number N; and
providing the context number of terms on either side of each of the N terms having model term scores that satisfy the threshold to the spell correction system.

25. The computer system as recited in claim 24, wherein the processors are configured to perform operations further comprising:
providing a higher score to one of two or more terms having the same model term score based on order of appearance.

26. The computer system as recited in claim 24, wherein the processors are configured to perform operations further comprising:
providing a higher score to one of two or more terms having the same model term score based on proximity to a term with a model term score that satisfies the threshold.

27. A non-transitory computer storage medium encoded with a computer program, the program comprising instructions that when executed by data processing apparatus cause the data processing apparatus to perform operations comprising:
receiving a search query;
identifying a plurality of search terms of the search query;
determining a model term score for each of the identified search terms, the model term score for a given search term of the identified search terms being indicative of a probability of misspelling of the given search term, wherein determining the model term score for the given search term includes determining whether the given search term is in a dictionary of a language model and wherein the model term score for the given search term is determined independent of any alternative suggestions that are alternative spellings of the given search term;
selecting candidate search terms from the identified search terms of the search query based on the model term scores, the candidate search terms being a subset of the identified search terms of the search query, wherein selecting a candidate search term of the candidate search terms comprises selecting the candidate search term based on the model term score for the candidate search term being more indicative of misspelling than the model term scores of other of the identified search terms not selected as one of the candidate search terms; and
providing the candidate search terms to a spell correction system.

28. The non-transitory computer readable storage medium as recited in claim 27, wherein instructions for determining the model term score for each of the identified search terms further include instructions for:
determining whether each of the identified search terms is in a dictionary of a language model; and
determining a language model term score for each of the identified search terms found in the dictionary of the language model.

29. The non-transitory computer readable storage medium as recited in claim 28, wherein instructions for determining a model term score for each of the identified search terms further include instructions for:
determining an n-gram model term score for each of the identified search terms not found in the dictionary of the language model, where each n-gram model term score has a value more indicative of misspelling than any of the language model term scores.

30. The non-transitory computer readable storage medium as recited in claim 27, wherein instructions for determining the model term score for each of the identified search terms further include instructions for:
determining if each of the identified search terms is in a language model and determining a language model term score for each of the identified search terms determined to be in the language model, wherein the language model term score is based on the probability of misspelling estimated by the language model using term frequency; and
determining an n-gram model term score for each of the identified search terms received and determined to not be in the language model, where determining the n-gram model term score is based on the probability of a character sequence estimated by the character n-gram model.

* * * * *